United States Patent [19]
Jordan

[11] Patent Number: 4,904,387
[45] Date of Patent: Feb. 27, 1990

[54] WASTE TREATMENT AND WATER RECYCLING TOILET SYSTEM

[75] Inventor: Edward J. Jordan, Brighton, Mich.

[73] Assignee: Thetford Corporation, Ann Arbor, Mich.

[21] Appl. No.: 208,737

[22] Filed: Jun. 17, 1988

[51] Int. Cl.$^4$ ............................................. C02F 3/30
[52] U.S. Cl. ................................. 210/605; 210/622; 210/623; 210/167; 210/195.1; 210/196; 210/259; 210/903
[58] Field of Search ................... 210/195.1, 220, 903, 210/167, 196, 257.1, 259, 605, 622, 623, 195.3

[56] References Cited

U.S. PATENT DOCUMENTS

| | | | |
|---|---|---|---|
| Re. 32,429 | 6/1987 | Spector | 210/903 |
| 3,429,806 | 2/1969 | Carter et al. | 210/195.1 |
| 3,817,857 | 6/1974 | Torpey | 210/903 |
| 3,875,051 | 4/1975 | Kovarik | 210/170 |
| 3,950,249 | 4/1976 | Eger et al. | 210/104 |
| 3,951,804 | 4/1976 | Smith | 210/195.1 |
| 3,953,327 | 4/1976 | Parker | 210/903 |
| 3,964,998 | 6/1976 | Barnard | 210/903 |
| 4,210,528 | 7/1980 | Coviello et al. | 210/220 |
| 4,315,821 | 2/1982 | Climenhage | 210/903 |
| 4,812,237 | 3/1989 | Cawley et al. | 210/605 |

FOREIGN PATENT DOCUMENTS 148946  6/1981  German Democratic Rep. .

Primary Examiner—Richard V. Fisher
Assistant Examiner—Christopher Upton
Attorney, Agent, or Firm—Harness, Dickey & Pierce

[57] ABSTRACT

A waste treatment and water recycling system that includes a delivery system, a trap, a sump, an anoxic reactor, an aerobic digestion chamber, a filtering system, an adsorption system, a disinfecting system and a water return system. The delivery system includes one or more flush-type toilets and urinals which receive flush water from the water return system and deliver the toilet and urinal waste and flush water to the anoxic reactor. The anoxic reactor contains bacteria which utilizes organics in the toilet waste to convert oxidized nitrogen compounds, such as nitrates, to nitrogen gas, produce bicarbonates and other products. The bacteria, in accomplishing this, lower the organic load on subsequent processes. A denitrified liquid containing bicarbonates and reduced amounts of organics is transferred to the aerobic digestion chamber, which contains biologically active solids and in which organic carbon, organic nitrogen, and ammonium compounds are oxidized by bacteria to obtain a liquid product high in concentration of oxidized nitrogen compounds such as nitrates and low in soluble carbonaceous compounds. This liquid product is filtered, treated with activated carbon, disinfected, and subsequently returned to the toilets and urinals as colorless, clear and odorless flush water containing oxidized nitrogen compounds such as nitrates. A portion of this liquid is recycled directly back to the trap to provide a constant flow of nitrates into the anoxic reactor during periods of toilet usage. The oxidized nitrogen compounds produced in the aerobic digestion chamber insure prevention of odors in the system.

8 Claims, 2 Drawing Sheets

WASTE TREATMENT AND WATER RECYCLING TOILET SYSTEM

BACKGROUND AND SUMMARY OF THE INVENTION

The present invention relates to improvements in waste treatment and water recycling toilet systems, particularly to systems of the general type shown in U.S. Pat. No. 3,950,249, dated Apr. 13, 1976 and U.S. Pat. No. 4,210,528, dated July 1, 1980 both of which are assigned to the assignee of this application. Municipal-type sewage treatment systems, such as shown in U.S. Pat. Nos. 3,953,327 and 3,964,998, which are commonly referred to as "flow through systems", also have some pertinence to the present invention.

U.S. Pat. No. 3,964,998 shows that it has been known to biologically lower the organic compound concentration in the sewage by treatment for the sewage under anoxic conditions followed by treatment under aerobic conditions. This sequence has been advantageous in that bacteria in the anoxic reactor utilize organics in the sewage to accomplish the breakdown of nitrates, thus requiring no addition of a supplemental organic source into the system. However, such a flow through system requires removal of sludge, thus creating the problem of sludge transport and disposal. Also, in a flow-through system, some of the nitrates resulting from the treatment process flow out of the system and are thus not available for the treatment of organics at the anoxic stage. As a result, the organic load on the aerobic stage is increased, thus requiring a system with a large size aerobic stage.

Closed loop systems in the past have been advantageous in that no external water supply is needed, thus minimizing the unnecessary usage of potable water. Difficulties have arisen, however, out of deficiencies in the biological process of these systems. As a result of these deficiencies, inadequate treatment of wastes often resulted in the production of obnoxious odors and colors in the flush water and a rapid accumulation of biological solids in the system.

The closed loop system disclosed in U.S. Pat. No. 4,210,528 provided a system having effective management of nitrogen in the system so that it could be made of reasonable size, avoid undesirable odors and slow the build-up of solids.

It is an object of the present invention to provide an improved management of nitrogen to increase the efficiency of the system.

SUMMARY OF THE INVENTION

The present invention provides sequentially located anoxic and aerobic stations in a toilet system so that nitrogen-containing compounds are managed in the system to obtain desirable results absent in the prior art.

The toilet waste system of this invention includes a waste delivery system, a trap, a sump chamber, an anoxic reactor, an aerobic digestion chamber, filtering, adsorption, and disinfection systems and a water return system. The delivery system, as illustrated, includes a single flush type toilet, but it is to be understood that it can include a plurality of toilets or a number of toilets and a number or urinals and, as a result, the term toilet, as used herein, is inclusive of all of the above. In addition to delivering toilet waste, the delivery system receives all wastewater from the facility including water from sinks, lavatories, dish washers, showers and the like. The delivery system also includes means for drawing flush water to the toilet from the water return system, and means for delivering the waste and the flush water to the trap. The anoxic reactor contains sludge and agitator means for periodically mixing the contents of the reactor to enhance denitrification of oxidized nitrogen compounds such as nitrates in the mixture.

While the process of biological denitrification is complex and not yet fully understood, it is generally accepted that facultative bacteria which exists in the sludge satisfy their metabolic requirements preferentially through the dissolved oxygen in the liquid. However, if the supply of dissolved oxygen is sufficiently low, "anoxic" conditions are said to exist, and under these conditions, bacteria will reduce oxygen-containing compounds such as nitrates or other oxidized nitrogen compounds. The anoxic reactor in this invention is maintained under these conditions. Bacteria in the reactor utilize toilet waste as the source of organics needed to effect the breakdown of nitrates or other oxidized nitrogen gas, and in the process the bacteria substantially lower the amount of organic waste in the reactor and produce bicarbonates. The nitrogen gas produced in this reactor is vented from the system thus reducing the concentration of dissolved solids. Liquid effluent from the anoxic reactor is then transferred to the aerobic digestion chamber.

Effluent from the anoxic reactor is high in concentration of bicarbonates and ammonium compounds and low in concentration of nitrates. It is thus seen that the anoxic reactor is not located in the system to accomplish the breakdown of nitrogeneous compounds in the toilet waste, such as ammonia, but to remove nitrates from the flush water and a substantial quantity of organic material from the toilet waste. In addition, the anoxic reactor produces bicarbonates necessary for the complete oxidation of the ammonium compounds in subsequent processes of the toilet waste treatment system.

The aerobic digestion chamber contains biologically active solids and aeration means to provide sufficient oxygen to effect both the oxidation or organic compounds, and the nitrification of nitrogen compounds in the mixed liquid. Although biological nitrification is also not yet fully understood, it has been found that under conditions of sufficient oxygen, nitrifying bacteria in the biologically active solids are able to oxidize ammonium compounds and convert these compounds to nitrates. The aerobic digestion chamber of the present invention is maintained under these conditions so that the bacteria utilize the bicarbonates in the mixed liquid as the necessary carbon source to accomplish the desired nitrification. Effluent from the aerobic digestion chamber is thus low in ammonium and carbonaceous compounds and high in nitrates.

As used herein, the expression "biologically active solids" includes bacteria in both suspended growth form and in attached growth form. In the suspended growth reactor, the bacteria is in suspension in the material commonly called "activated sludge" and in the attached growth reactor the bacteria are attached to solid bodies. Thus while the invention is particularly described with respect to the use of activated sludge in the aerobic digestion chamber, it is to be understood that it is within the purview of this invention to use bacteria in the attached mode in the aerobic digestion chamber.

Screened liquid is removed from the aerobic digestion chamber and passed directly, under pressure, to the filters which remove suspended solids, colloidal matter and large amounts of bacteria from the liquid. Filtrate is then transferred to absorption means which includes a bed of activated carbon. The internal pore structure of activated carbon and the affinity of activated carbon for organic matter provide for the removal of undesirable color and odor from the liquid. Liquid is disinfected and then transferred to a water storage tank from which, on demand from the delivery actuator, it is delivered to the toilet, thus completing the cycle.

Due to the arrangement of the present invention, nitrates produced in the aerobic digestion chamber are present throughout the filtering, adsorption, disinfecting and water return and delivery systems. The presence of nitrates in the liquid in the filtering and absorption systems prevents the reduction of sulfates which may also be present in the liquid. The reduction of sulfates would otherwise cause the production of hydrogen sulfide which has a readily recognizable obnoxious odor. Nitrates are still present in the liquid as it is delivered with toilet waste into the anoxic chamber, thus inducing greater biological destruction of organic wastes and increased production of bicarbonates for use in the aerobic digestion chamber. The management of nitrates in the present system thus allows for prevention of hydrogen sulfide or other obnoxious odors, efficient biological treatment of toilet water and corresponding reduction in the requirements for aerobic digestion chamber size.

The present invention also provides indefinite retention of sludge solids. This insures sufficient microorganism age to accomplish the desired results in the biological treatment process. In the system of this invention, the amount of biologically active solids in the aerobic chamber and the amount of organic material supplied from the anoxic reactor are balanced such that minimum sludge accumulation rates and maximum nitrification rates are achieved in the aerobic chamber. Elimination of excess sludge production and the need for disposal thereof prevents the potential pollution of external surface and subsoil water supplies. Also, the recycle and reuse of water prevents the unnecessary usage and pollution of water supplies.

Further object, features and advantages of this invention will become apparent from a consideration of the following description, the appended claims and the accompanying drawing, which is a diagrammatic view of the system of the present invention.

DESCRIPTION OF THE PRESENT INVENTION

Figure 1:
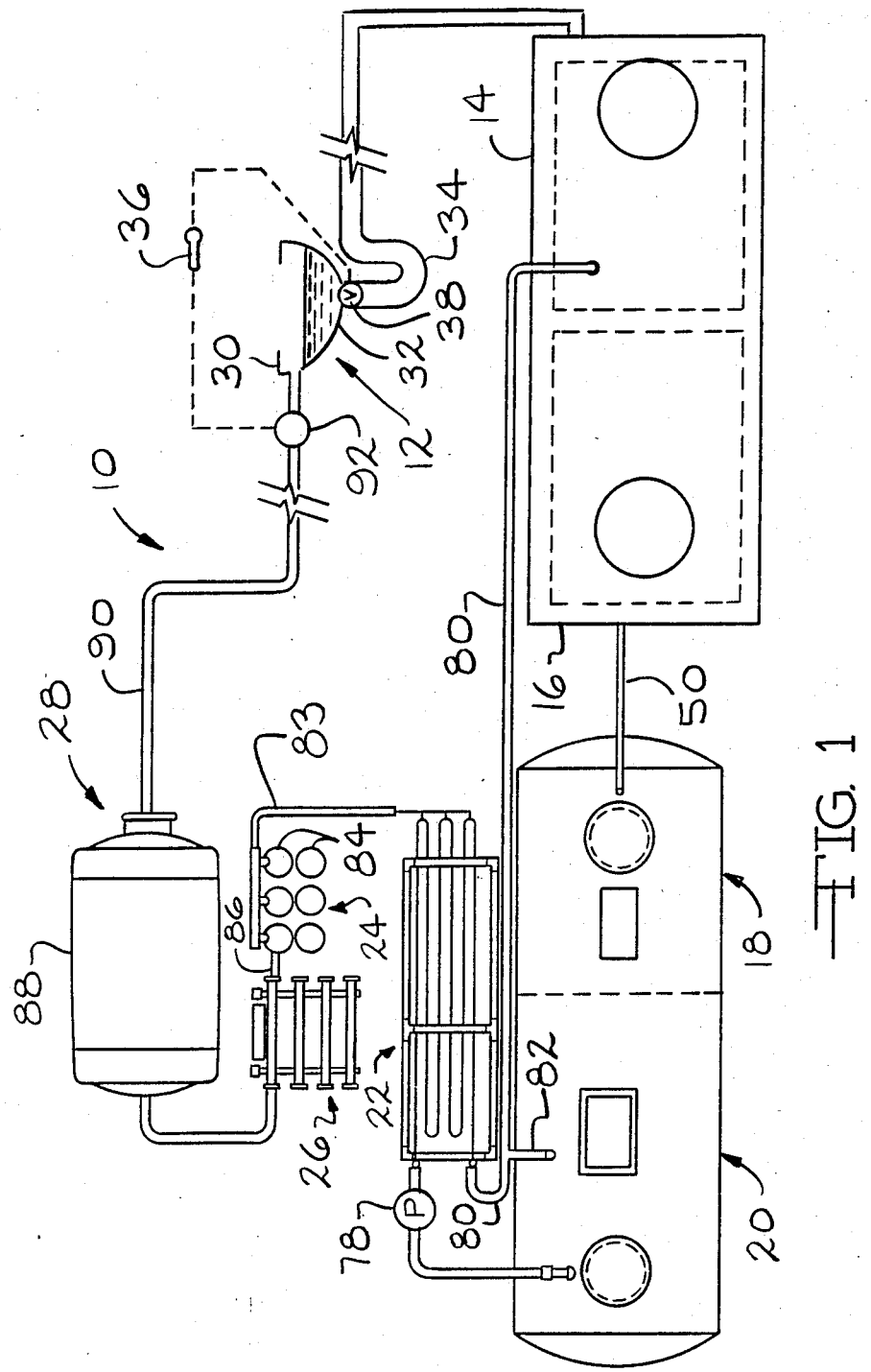
FIG. 1 is a diagrammatic view partially in plan of a waste treatment and water recycling toilet system of the present invention.
Figure 2:
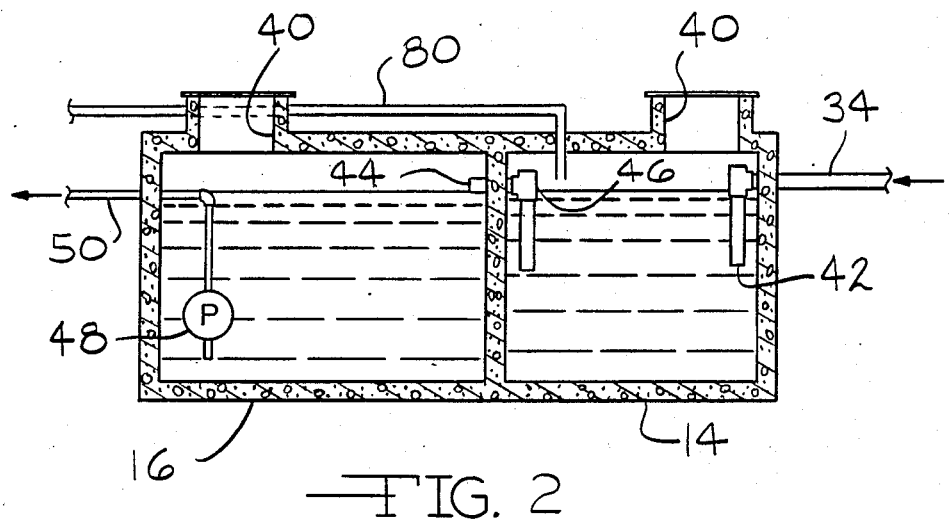
FIG. 2 is a sectional view of a portion of the system of FIG. 1 as seen substantially along line 2—2.

The waste treatment and water recycling toilet system of this invention, indicated generally at 10 in FIG. 1, comprises a waste delivery system 12, a trap 14, a sump chamber 16, an anoxic reactor 18, an aerobic digestion station 20, a filtering system 22, an adsorption system 24, a disinfecting system 26, and a water return system 28. The delivery system 12 includes a toilet 30 having a waste deposit bowl 32 and an outlet passage 34. The system 12 also includes a demand actuator 36 operatively associated with a toilet valve 38 located in the passage 34. In response to manual operation of the actuator 36, the valve 38 is opened allowing the contents of the bowl 32 to flow through the passage 34 and into the trap 14. From trap 14. the waste mixture flows into sump chamber 16 from which the mixture is pumped into the anoxic reactor 18. FIG. 2 illustrates the details of the trap 14 and sump chamber 16. As shown, both the trap 14 and the sump 16 are underground concrete storage tanks each having a manway opening 40 to access the interior of the tanks. Outlet passage 34 delivers waste from toilet 30 to trap 14. The discharge end 42 of passage 34 is located below the fill line of trap 14. Trap 14 allows non-organic particles such as sand and dirt to settle to the bottom of trap 14 for later removal and disposal. Trap 14 can also include means to break up the solid particles in the toilet waste. When the level of waste in trap 14 reaches opening 44 to sump chamber 16, the waste flows through conduit 46 into sump chamber 16. Sump chamber 16 contains a discharge pump 48 which pumps the waste mixture through conduit 50 into the anoxic reactor 18. Sump 16 is used to regulate the flow of waste into anoxic reactor 18 and provides an even flow into the anoxic reactor regardless of the usage of toilet 30.

Figure 3:
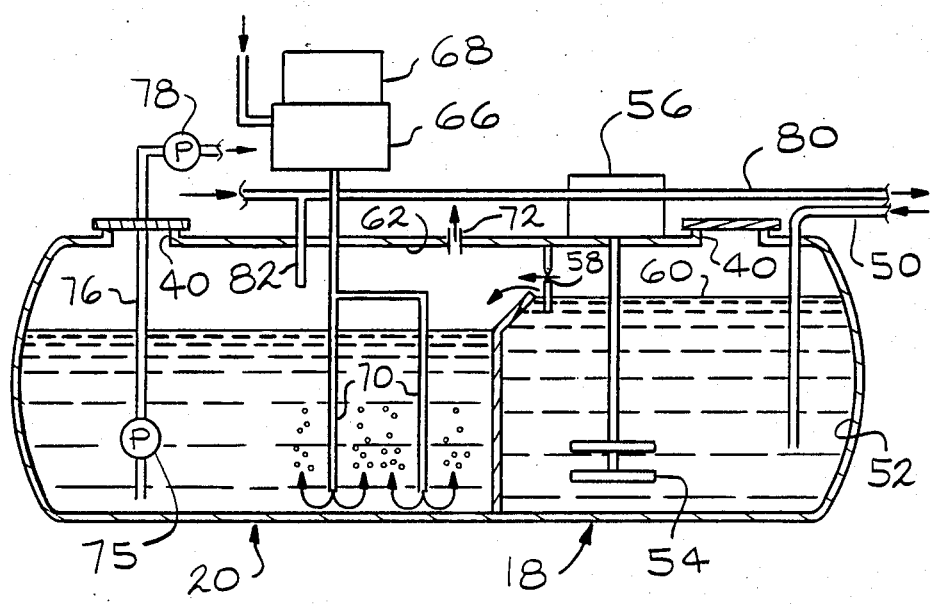
FIG. 3 is a sectional view of a portion of the system of FIG. 1 as seen substantially along line 3—3.

Referring now to FIG. 3, the anoxic reactor 18 has sludge containing bacteria in it and is located in the system 10 to provide partial biological treatment of influent toilet waste and denitrification of nitrates contained in the influent. The reactor 18 includes a treatment chamber 52 having a manway 40 and an agitator 54 driven by a air pump 56. The air pump 56 is operated intermittently to provide for the intimate physical contact of toilet waste, flush water and bacteria in the anoxic sludge. Bacteria in the reactor utilize toilet waste as the source of organics needed to effect the breakdown of nitrates to nitrogen gas and produce bicarbonates and in the process the bacteria substantially lower the amount of organic waste in the reactor. When the air pump 56 is off, the solid matter settles in chamber 52. The chamber 52 is maintained under low oxygen conditions, (not in excess of 0.5 mg/l, and ideally zero, dissolved oxygen), in which the primary compound being reduced by bacteria in the anoxic sludge is nitrate; such conditions being known as anoxic conditions. The compounds produced in the treatment chamber 52 under these conditions include nitrogen gas and bicarbonates, according to the following reaction wherein the organic waste is represented by methanol:

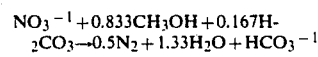

Gases are released from the chamber 52 through a conventional one-way vent valve 58. The one-way valve 58 prevents the entry of oxygen into chamber 52 and thereby maintains a low concentration of dissolved oxygen in the partially treated mixture 60 in the chamber 52. Introduction of influent to the chamber 52 causes wash-over of partially treated liquid 60 from the chamber 52 to the aerobic digestion station 20 so as to control the fluid level in the chamber 52. The trap 14 and sump chamber 16 can also be maintained in anoxic conditions to begin the biological treatment of influent toilet waste and denitrification of nitrates contained in the influent.

The aerobic digestion station 20 is located in the system 10 downstream from and adjacent to the reactor 18 to provide for the biological treatment of effluent from the anoxic reactor 18 and the nitrification of ammonium compounds in the effluent to produce nitrates. The aerobic station 20 comprises a treatment chamber 62, having manway 40, containing biologically active solids in the suspended growth mode and aeration means 64 which includes a pump 66 driven by a motor 68 operable to deliver air through conduits and fine bubble diffusers 70 to denitrified liquid in the chamber 62. The aeration means 64 agitates the material in chamber 62 and provides for mixing of the denitrified liquid and activated sludge contained in the chamber 62, and also provides an oxygen source for bacteria in the activated sludge to accomplish the nitrification process. The bacteria uses bicarbonates in the liquid as the carbon source necessary to effect the oxidation of nitrogeneous compounds, such as ammonia, to produce nitrates, according to the following reaction:

$$NH_4^{+1} + 2O_2 + 2HCO_3^{-1} \rightarrow NO_3^{-3} + 2H_2CO_3 + H_2O$$

In the process, additional organic matter in the waste is digested in the chamber 62. The dissolved oxygen concentration in the aerobic chamber should be maintained at least above 2 mg/l and should ideally be above 4 mg/l to attain maximum nitrification. To accomplish this, along with adequate agitation, it is preferable that air be admitted through the chamber, in the form of small bubbles, at a rate of at least 30,000 cubic feet per pound of BOD (biochemical oxygen demand) being loaded on the aerobic chamber. Where mixing is accomplished otherwise, lower aeration rates can be used to accomplish the desired dissolved oxygen concentration.

Treated liquid in the chamber 62 is pumped into conduit 76 by grinder pump 75. Grinder pump 75 macerates any solids in the water in chamber 62 as pump 75 feeds pump 78. Pump 78 raises the pressure and flow into the filtering system 22. The filtering system 22 provides means for separating solids, sludge, organic matter and bacteria from biologically treated liquid via a tubular filter membrane and passing a clarified effluent on to the adsorption system 24. The filter membrane is preferably of submicron pore size to provide ultrafiltration and substantially complete filtration of bacteria and colloidal particles of a size greater than 0.5 microns from the liquid. The filtrate should ideally not contain in excess of 5 mg/l of BOD. This best assures there will be no significant denitrification of the filtrate prior to its entrance to the anoxic chamber as the flush water. The rate of flow of liquid to the filtering system 22 is purposely made substantially greater than the filtering capacity of the filter membrane. As a result, some of the liquid does not pass through the filters but instead washes over the surfaces of the filter thus cleaning these surfaces and returns through conduit 80 to trap 14 or through conduits 80 and 82 back to the aerobic chamber 62.

It should be noted that the product of the aerobic station is transferred directly to the filtering station. That is, there is no sedimentation step, there is no sedimentation chamber, between the aerobic station and the filtering station. This would appear to be disadvantageous in that with the elimination of sedimentation prior to filtration, a heavier load is placed on the filtering station since without sedimentation there is little if any settling of solids from the liquid prior to filtration, to the end that the liquid transferred to the filtering station contains more solids than would be the case where there is prior sedimentation, thereby increasing the load on the filtering station in its function of removing solids from the liquid.

But no matter this transfer of the product of the aerobic station directly to the filtering station may increase the load on the filtering station, it is, in the overall, highly advantageous and of importance to the method and system in that it maximizes the nitrate concentration of the filtered water cycled back to the toilet station for use as flush water. That is, because there is high nitrate concentration in the flush water there is optimum efficiency in the anoxic chamber where denitrification occurs with its attendant bacterial disintegration of the waste solids into liquid and gas.

In short, high nitrate concentration is desirable in the flush water waste mixture flowing into the anoxic chamber in order to facilitate and optimize the anoxic chamber's function—and in the system of the present invention the high nitrate concentrate is obtained within the system itself. That is, it is in the aerobic chamber where the nitrification occurs by way of the flow of air through the liquid in that chamber—which flow of air also stirs or agitates the mix. Hence it is in the aerobic station that nitrate concentrate is highest and by transferring the product of the aerobic station directly to the filtering station, rather than by way of an intermediate sedimentation step, the highest possible nitrate concentration in the filtrate from the filtering station is attained. This is because sedimentation requires that there be quiescence, and therefore no flow of air. When the product of the aerobic station, containing bacteria as it does, sits in a state of quiescence, at least some denitrification occurs and hence a reduction in nitrate concentration.

So it is by the elimination of sedimentation—by transferring directly from the aerobic station to the filtering station—the method and system of the present invention provides a high nitrate concentration in the flush water cycled from the filtering station. The added load on the filters is attended to by transferring the liquid from the aerobic station to the filtering station at a rate greater than the capacity of the filters whereby there is a washing action on the surfaces of the filters.

The reduction of nitrogen in the anoxic reactor 18 can be improved by increasing the recycle flow rate of nitrate rich water into the anoxic reactor 18. This is accomplished by returning a portion of the filter wash water through line 80 back to the trap 14 from which it ultimately flows into the anoxic reactor. This improved the system performance without additional cost. The filter wash water has the same $NO_3$ concentration as the recycled water that goes back to the toilets. It is not practical to increase water recycling by increasing the water returned to the toilets because this would require more toilet usage. It is preferable to recycle the water from the filter system 22 to the trap 14. By recycling the filter wash water to trap 14, an even flow of nitrate rich water into the anoxic reactor can be maintained during periods of low toilet usage, such as weekends or night in office building applications. By recycling the filter wash water to the trap 14, nitrates can be further reduced without increasing toilet usage. As a result, the amount of organic waste in the reactor is reduced, reducing the amount of organic matter in the waste to be digested in the aerobic chamber 62 and thereby improving the efficiency of the digestion in aerobic chamber 62. During periods of high toilet usage, the filter wash water is recycled back to the aerobic chamber for digestion of the solid particles.

Filtered liquid passes through a conduit 83 to a bed of activated carbon 84 in the adsorption system 24. The internal pore structure of the activated carbon 84 in the adsorption system 24, and the affinity of this activated carbon for organic matter provide for the removal of undesirable color and odor from the filtered liquid.

Colorless, odorless liquid from the adsorption system 24 is then transferred through a conduit 86 to a disinfection system 26 which is a conventional structure, such as the unit shown in U.S. Pat. No. 3,551,091. From system 26 the disinfected liquid, still containing the nitrates, flows to the water return system 28. The water return system 28 includes a storage tank 88 and a conduit 90 communicating with the toilet bowl 32. A valve pump unit 92 operatively associated with the demand actuator 36 is located in the conduit 90. In response to activation of the actuator 36, the unit 92 is opened and disinfected liquid is pumped through the conduit 90 and delivered to the bowl 32 for use as flush water.

In the operation of the system 10, assume that human waste has been deposited in the toilet bowl 32. The actuator 36 is then activated causing an influent high in concentration of nitrogenous compounds from the waste, such as urea, and high in nitrates from the flush water, to be delivered from the bowl 32 through trap 14 and a sump chamber 16 to anoxic reactor 18 to be treated biologically therein as described above. Effluent from the anoxic reactor 18 is high in concentration of bicarbonates and ammonium compounds and low in nitrates. The effluent is further treated in the aerobic digestion station 20 to produce a mixed liquid low in concentration of carbonaceous and ammonium compounds and high in nitrates. Liquid containing nitrates is passed through the filtering system 22 where solids, sludges and bacteria are separated and returned to the trap 14 or aerobic digestion station 20. Filtrate high in concentration of nitrates is gathered from the filtering system 22 and passes through the adsorption system 24 for removal of color and odor and on to a water return system 28 from which clarified liquid high in concentration of nitrates is transferred to the delivery system 12 for use as flush water.

By receiving wastewater from all water fixtures within the facility, not just from toilets, the system receives more water than is required for use as toilet flush water. As a result, excess treated water is discharged from the system. The excess water can be discharged from the system at any point between filter system 22 and toilet 30. The discharge rate is approximately one gallon per day per person.

Because the system receives water from non-toilet fixtures which is not nitrate rich and water is discharged from the system, it is not a true closed loop system. However, most all of the treated water and the nitrates contained therein, produced in the aerobic chamber, are returned to the anoxic rector in the flush water. Nitrates delivered with flush water into the anoxic reactor 18 enhance the digestion of organic loading on the aerobic digestion station 20 and further aid in the production of bicarbonates for use in the nitrification process in the aerobic station 20. Typically, the BOD reduction in the anoxic reactor ranges from about 40% to 75%, thereby assuring that nitrification will be optimized in the aerobic chamber. The end result is a greater reduction in sludge formation thereby eliminating the need for frequent sludge removal from the chambers. Nitrates produced in liquid in the aerobic station 20 prevent the reduction of sulfates and subsequent production of hydrogen sulfide. It is to be understood that while the system 10 has been particularly described with regard to the production of nitrates in the aerobic station 20 and the beneficial use of these nitrates in the anoxic reactor, and while ideally all of the oxidized nitrogen compounds generated during the nitrification will be nitrates, which is the highest state of oxidation of nitrogen, nevertheless some of the nitrogen compounds resulting from the nitrification may be in a lower state of oxidation, e.g. with a +3 valence, all such compounds being within the intended meaning of the term "oxidized nitrogen compound."

It is also seen that biological activity in the chamber 20 insures degradation of solids not completely reduced in the anoxic rector 18 and further insures that rapid accumulation of biological solids in the chamber 20 is prevented. The treatment system thus provides, as a result of the managed use of nitrogen in the system, a method and apparatus for effectively treating toilet waste and re-using flush water while retaining compactness.

What is claimed is:

1. In a substantially closed loop multi-stage method for treating toilet waste and recycling treated liquid therefrom, the steps of:
    a. receiving said waste at a first stage and flushing said waste from said first stage with flush water containing nitrates thereby to form a liquid mixture of the waste and nitrate-containing flush water;
    b. transferring said liquid mixture to a trap in which non-waste solid particles are separated from said liquid mixture;
    c. transferring said liquid mixture through a sump to regulate the flow of said liquid mixture to a second stage whereby said mixture is agitated and is maintained under anoxic conditions so as to cause denitrification of said liquid mixture and generation of nitrogen gas, said nitrogen gas being vented from said second stage in such manner as to prevent the entry of oxygen into said second stage thereby to assist in maintaining the anoxic conditions in said second stage;
    d. transferring liquid from said second stage to a third stage containing biologically active solids and liquid and being maintained under aerobic conditions, air being passed through the mixture in said third stage at a sufficient rate to cause nitrification of nitrogeneous compounds in said mixture, thereby to produce nitrates therein, the dissolved oxygen in the mixture in said third stage being greater than 2 mg/l;
    e. transferring the nitrate-containing mixture from said third stage directly to a filtering stage wherein said mixture is filtered to separate nitrate-containing water therein from the solids therein said nitrate-containing mixture being transferred to said filtering stage at a rate in excess of said filtering stage capacity to filter said mixture so as to create a flow of nitrate-containing liquid to wash solids from said filtering stage;
    f. cycling filtered nitrate-containing water from said filtering stage to said first stage thereby to serve as said nitrage-containing flush water in said first stage; and g. recirculating a portion of said nitrate-containing wash liquid to said trap to maintain a substantially constant flow of nitrate-containing liquid into said trap.

2. A method according to claim 1 in which the nitrate-containing water separated from the solids in said filtering stage is passed through a bed of activated carbon and is thereafter disinfected before being cycled to said first stage.

3. A method according to claim 1 in which the air is passed through said mixture in said third stage at a sufficient rate to accomplish evaporation of some of the liquid in the third stage to maintain a constant fluid level.

4. A method according to claim 1 in which the rate of input of said air into said third stage is a least about 30,000 cubic feet per pound per BOD loaded on said third stage.

5. A method according to claim 1 in which the agitation of said mixture in said second stage is periodic.

6. A method according to claim 1 in which said liquid mixture is maintained under anoxic conditions in said trap and said sump.

7. A substantially closed loop waste treatment and water recycling toilet system comprising:
   a. a toilet station comprising a waste receiving toilet, means for admitting nitrate-containing water to said toilet to flush the waste from the toilet and form a mixture of said waste and said nitrate-containing water;
   b. means for transferring said mixture to an anoxic station, said transfer means including a trap for removing non-waste solid particles from said mixture and a sump for regulating the flow of said mixture into said anoxic station;
   c. said anoxic station comprising a chamber containing sludge, means for mixing said sludge with said mixture of waste and nitrate-containing water and means for maintaining said chamber under anoxic condition so as to cause denitrification of the mixture in said chamber thereby to produce nitrogen gas, and including a one-way valve for venting nitrogen from said chamber while preventing the entrance of oxygen into said chamber;
   d. means for transferring liquid from said chamber to an aerobic station;
   e. said aerobic station comprising an aerobic chamber containing biologically active solids which form a mixture with the liquid from said anoxic station, and further including aeration means supplying air to the mixture in said aerobic chambers to agitate the mixture in said aerobic chamber and to induce nitrification of nitrogenous compounds in said aerobic chamber thereby to generate nitrates in the mixture in said aerobic chamber, said filter and transfer means being constructed and arranged such that said mixture within the aerobic chamber has a concentration of dissolved oxygen greater than 2 mg/l;
   f. means for transferring the mixture from said aerobic chamber directly to a filtering station;
   g. said filtering station comprising a filter for separating nitrate-containing water from solids in the mixture received by said filtering station from said aerobic chamber, said filter and transfer means being constructed and arranged such that the filter surfaces are cleaned by a flow rate of said mixture from said aerobic chamber at a rate substantially greater than the filtering capacity of said filter means whereby some of said mixture washes over said filter surface forming a cleaning mixture of nitrate-containing water and solids;
   h. means for transferring the nitrate-containing water from which solids have been removed from said filtering station to a purification station;
   i. said purification station including means for circulating said nitrate-containing water through an absorbent material for removal of odor and color therefrom;
   j. means for cycling the nitrate-containing water from said purification station to said toilet station for use of said nitrate-containing water as the flush water in said toilet station; and
   k. means for recirculating said cleaning mixture to said trap to maintain a substantially constant flow of nitrate-containing water into said trap.

8. The system according to claim 7 further comprising means for maintaining said trap and sump under anoxic conditions.

* * * * *

UNITED STATES PATENT AND TRADEMARK OFFICE
CERTIFICATE OF CORRECTION

PATENT NO.   :   4,904,387
DATED        :   February 27, 1990
INVENTOR(S)  :   Edward J. Jordan It is certified that error appears in the above-identified patent and that said Letters Patent is hereby corrected as shown below:

Column 3, line 5, "absorption" should be --adsorption--.
Column 3. line 17 and 18, "absorption" should be --adsorption--.

Column 3, line 29, "water" should be --waste--.

Column 4, line 12, "." should be --,--.
Column 4, line 34, "a" should be --an--.
Column 6, line 21, "concentrate" should be --concentration--.
Column 6, line 52, "improved" should be --improves--.

Column 8, line 19, "rector" should be --reactor--.

Column 8, line 59, after "therein", insert --,--.
Column 8, line 67, "nitrage-containing" should be --nitrate containing--.

Signed and Sealed this

Sixteenth Day of July, 1991

*Attest:*

HARRY F. MANBECK, JR.

*Attesting Officer*   *Commissioner of Patents and Trademarks*